United States Patent [19]
Goto

[11] Patent Number: 5,411,338
[45] Date of Patent: May 2, 1995

[54] MOTOR BEARING DEVICE

[75] Inventor: Noriatsu Goto, Yonago, Japan

[73] Assignee: Matsushita Electric Industrial Co., Ltd., Osaka, Japan

[21] Appl. No.: 187,535

[22] Filed: Jan. 28, 1994

[30] Foreign Application Priority Data

Jan. 29, 1993 [JP] Japan .................. 5-002144 U

[51] Int. Cl.$^6$ ............................................. F16C 43/04
[52] U.S. Cl. ...................................... 384/537; 384/585
[58] Field of Search ............... 384/510, 537, 559, 561, 384/564, 584, 585

[56] References Cited

U.S. PATENT DOCUMENTS

| | | | |
|---|---|---|---|
| 3,428,379 | 2/1969 | Readman | 384/537 |
| 3,451,736 | 6/1969 | Riccio | 384/537 |
| 3,482,125 | 12/1969 | Fleckenstein | 384/537 X |
| 4,810,108 | 3/1989 | Yajima | 384/585 X |
| 5,207,514 | 5/1993 | Weissgerber | 384/537 X |
| 5,215,386 | 6/1993 | O'Dwyer | 384/585 X |

FOREIGN PATENT DOCUMENTS 62-281741 12/1987 Japan .

*Primary Examiner*—Thomas R. Hannon
*Attorney, Agent, or Firm*—Wenderoth, Lind & Ponack

[57] ABSTRACT

A motor bearing device includes a rotary shaft, a bearing housing having a hole, a ball bearing rotatably supporting the shaft and arranged in the hole of the bearing housing and fixed to an outer ring of the ball bearing with adhesive, and an adhesive puddle formed at an inner surface of the hole of the bearing housing on a side of the bearing housing used for inserting the ball bearing into the bearing housing. A part of the adhesive is trapped in the puddle. The puddle can also be formed at an outer surface of the outer ring that corresponds to the inner surface of the hole of the bearing housing on the side thereof used for inserting the ball bearing into the bearing housing.

8 Claims, 3 Drawing Sheets

MOTOR BEARING DEVICE

BACKGROUND OF THE INVENTION

The present invention relates to a motor bearing device including a ball bearing for rotatably supporting a rotary shaft which is used for various kinds of office automation devices and audio visual devices.

In such a kind of bearing device, an outer ring of a ball bearing is fixed to the bearing housing by known techniques. In one of the techniques, the outer ring of the ball bearing is fitted into a hole of the bearing housing under pressure. In an other of the techniques, as shown in FIG. 4, the outer ring of the ball bearing is fixed in the hole of the bearing housing with an adhesive.

However, according to the above construction, for example, in the former technique it is necessary to make the construction of the bearing housing for supporting the ball bearing firm in order to insert the outer ring of the ball bearing into the hole of the bearing housing under pressure. Thus, the design of the bearing device results in a lacking of a degree of freedom, because it is dependent on the construction of the bearing housing. Additionally, it is difficult to control the fitting conditions of the ball bearing and the bearing housing under pressure. Thus, the strength of the ball bearing to prevent it from slipping off becomes small and the device may have any deformation, dependent on the interference between the ball bearing and the bearing housing under pressure. Therefore, it is necessary to make the outer diameter of the ball bearing and the inner diameter of the bearing housing precise and to select a suitable combination thereof.

In the latter known technique, an adhesive has been previously applied to the inner surface of the hole of the bearing housing before the ball bearing is inserted into the hole of the bearing housing. However, even though the amount of the applied adhesive is controlled, the adhesive may be stuck out from the hole of the bearing housing. Therefore, it is difficult to form a uniform adhesive layer between the ball bearing and the bearing housing, resulting in a non-uniform adhesive strength.

SUMMARY OF THE INVENTION

Accordingly, an object of the present invention is to provide a motor bearing device improving the workability and cost for fixing a ball bearing to a bearing housing and the reliability of the motor bearing device.

In accomplishing these and other objects, according to one aspect of the present invention, there is provided a motor bearing device comprising a rotary shaft, a bearing housing having a hole, a ball bearing rotatably supporting the shaft and arranged in the hole of the bearing housing and fixed to an outer ring of the ball bearing with adhesive; and an adhesive puddle formed at an inner surface of the hole of the bearing housing on a side at which the ball bearing is inserted into the bearing housing, in which puddle a part of the adhesive is trapped.

According to another aspect of the present invention, there is provided a motor bearing device comprising a rotary shaft, a bearing housing having a hole, and a ball bearing rotatably supporting the shaft and arranged in the hole of the bearing housing, the housing being fixed to an outer ring of the ball bearing with adhesive. The outer ring has an adhesive puddle formed at an outer surface of the outer ring which corresponds to an inner surface of the hole of the bearing housing, at a side at which the ball bearing is inserted into the bearing housing, and with a part of the adhesive being trapped in the puddle.

BRIEF DESCRIPTION OF THE DRAWINGS

These and other aspects and features of the present invention will become clear from the following description when taken in conjunction with the preferred embodiments thereof and with reference to the accompanying drawings, in which.

DETAILED DESCRIPTION OF THE PREFERRED EMBODIMENTS

Figure 1:
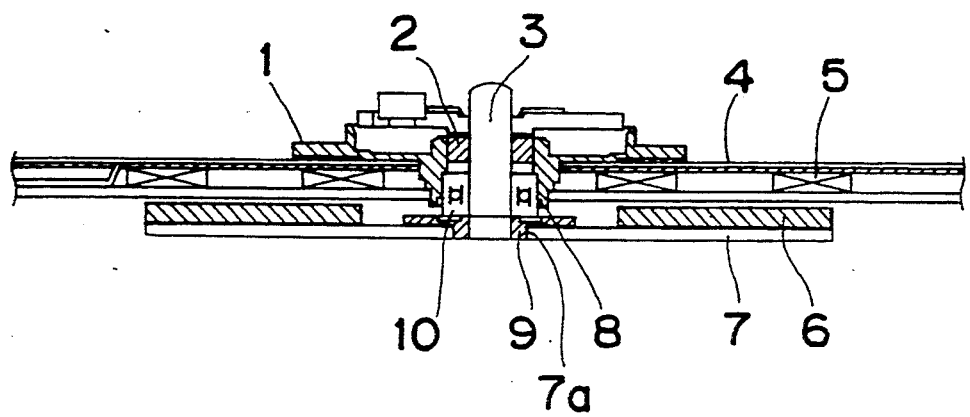
FIG. 1 is a cross-sectional view showing a bearing device of a small-sized direct current motor according to one embodiment of the present invention.
Figure 4:
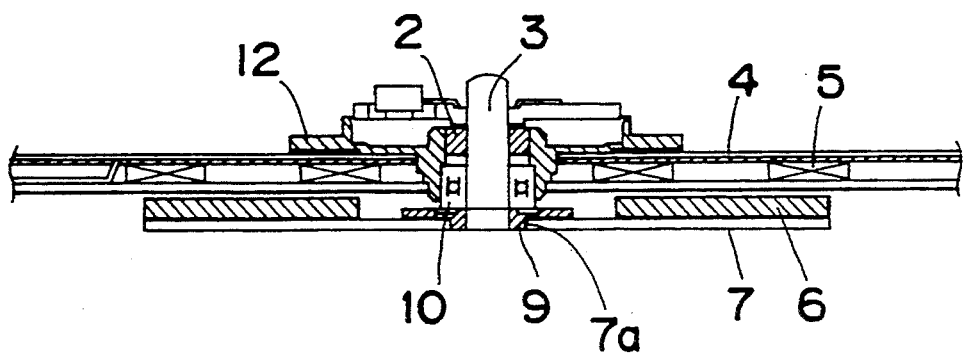
FIG. 4 is a cross-sectional view showing the construction of a conventional bearing device of a small-sized direct current motor.

Before the description of the present invention proceeds, it is to be noted that like parts are designated by like reference numerals throughout the accompanying drawings.

A bearing device of a small-sized direct current motor according to one embodiment of the present invention will be described below with reference to the drawings.

FIG. 1 shows a cross-sectional view of the motor. The motor includes a bearing housing 1, a bearing metal 2 fitted into a hole 1b of the bearing housing 1, a rotary shaft 3 for rotating in the housing 1, a yoke 4 for constructing a magnetic circuit, a coil 5 for driving the motor, permanent magnets 6, a rotor frame 7 having the permanent magnets 6, an adhesive puddle 8 formed at the housing 1, a rotor hub 9 which is fixed to one end of the shaft 3, and a ball bearing 10 for rotatably supporting the rotary shaft 3. The bearing metal 2 comes into contact with the rotary shaft 3 while the shaft 3 rotates. The rotor hub 9 is fitted into a hole 7a of the rotor frame 7. The rotor frame 7 is fixed to the rotor hub 9 to rotate together with the shaft 3 and the hub 9.

Figure 2:
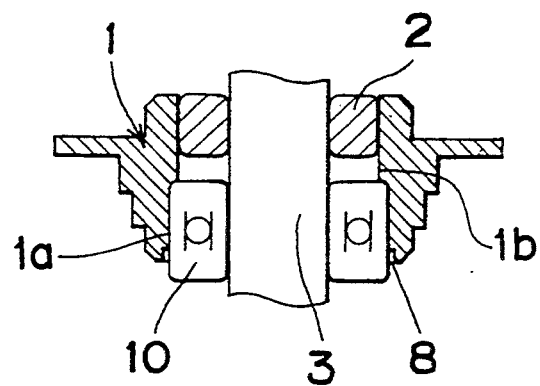
FIGS. 2 and 3 are enlarged cross-sectional views of the bearing device and its bearing housing.
Figure 3:
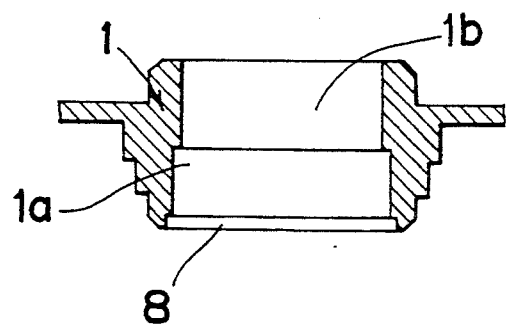

FIGS. 2 and 3 show enlarged cross-sectional views of the bearing device and the bearing housing 1. The housing 1 has two kinds of holes. One hole 1b of the holes has a smaller inner diameter and accommodates the bearing metal 2. The other hole 1a of the holes has a larger inner diameter and is formed adjacent to the hole 1b, with a step formed between the holes 1b and 1a. The ball bearing 10 is inserted and fitted into the hole 1a until one axial end, an upper end in FIG. 2, of the ball bearing 10 contacts the step. The adhesive puddle 8 is formed by an annular recess formed on the inner surface of the hole 1a of the bearing housing 1 at its lower end in FIGS. 2 and 3 so that the adhesive puddle 8 is formed between the outer ring of the ball bearing 10 and the inner surface of the bearing housing 1 at the end of the housing 1.

According to the bearing device with the above construction, after an adhesive is applied to the outer ring of the ball bearing 10, the ball bearing 10 is inserted and fitted into the hole 1a of the bearing housing 1. When the ball bearing 10 is inserted into the hole 1a of the bearing housing 1, an excess amount of the adhesive is stuck out from a clearance between the outer ring of the ball bearing 10 and the inner surface of the hole 1a and then is trapped into the adhesive puddle 8. Therefore, an approximately constant amount of the adhesive which has been applied to the outer ring of the ball bearing 10 and is stuck out from the clearance when the ball bearing 10 is inserted into the hole 1a of the bearing housing 1 is certainly trapped in the puddle 8. If the adhesive puddle 8 is connected to the outside of the bearing device so that an outside light from the outside of the bearing device is incident in the adhesive puddle 8, an ultraviolet cure type adhesive which is cured by a light from the outside of the bearing device can be used for the adhesive to certainly form an adhesive layer between the outer ring of the ball bearing 10 and the inner surface of the hole 1a of the bearing housing 1. An example of the ultraviolet cure type adhesive is "648UV", a trade name manufactured by LOCTITE Kabushiki Kaisha, and which is anaerobic. Other adhesives than ultraviolet cure type adhesives can also be used. An example of such a type of adhesive is "648", a trade name manufactured by LOCTITE Kabushiki Kaisha and which is also anaerobic.

As one more specific example of the embodiment, the rotary shaft 3 has a 4 mm-outer diameter, the outer ring of the ball bearing 10 has a 7 mm-outer diameter, the hole 1a of the housing 1 has a 7 mm-inner diameter, the puddle 8 has a depth of 0.02 mm–0.035 mm, and the gap between the outer surface of the outer ring of the ball bearing 10 and the inner surface of the hole 1a of the housing 1 is 0.001–0.01.

According to the embodiment, the adhesive puddle 8 is provided at the hole 1a of the housing 1 on the side used for inserting the ball bearing 10. Therefore, an approximately constant amount of the adhesive can be certainly trapped out into the puddle 8 between the housing 1 and the ball bearing 10, and thus a desired amount of the adhesive can be easily held between the ball bearing 10 and the housing 1. Additionally, if an outside light from the outside of the bearing device is incident in the adhesive puddle 8 so as to cure the adhesive with the outside light, an ultraviolet cure type adhesive which is cured by the light can be used for the adhesive to certainly form an adhesive layer between the outer ring of the ball bearing 10 and the inner surface of the hole 1a of the bearing housing 1. Thus, it is possible to improve the workability and cost for fixing the ball bearing 10 to the bearing housing 1, and the reliability thereof.

Figure 5:
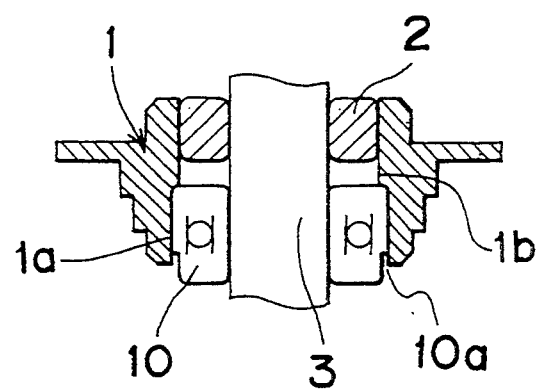
FIG. 5 is an enlarged cross-sectional views of the bearing device according to a modification of the embodiment in FIG. 2.

FIG. 5 shows a modification of the embodiment of FIG. 2. That is, the annular adhesive puddle is formed on the outer surface of the outer ring of the ball bearing 10, instead of the inner surface of the bearing housing 1. The modification can obtain the same operation and effects as the embodiment of FIG. 2.

Although the present invention has been fully described in connection with the preferred embodiments thereof and with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A motor bearing device, comprising:
   a rotary shaft;
   a bearing housing having a hole therein, said hole being defined by an inner surface of said bearing housing, and said bearing housing further having a bearing insertion side;
   a ball bearing arranged in said hole of said bearing housing, and said ball bearing including an outer ring fixed in said hole of said bearing housing with an adhesive; and
   an adhesive puddle formed at said inner surface of said bearing housing and located on said bearing insertion side of said bearing housing, a part of said adhesive being trapped in said adhesive puddle.

2. The motor bearing device of claim 1, wherein said adhesive puddle is an annular recess formed on said inner surface of said bearing housing and located on said bearing insertion side of said bearing housing.

3. The motor bearing device of claim 2, wherein said adhesive is an ultraviolet cure type adhesive curable by the application of an outside light.

4. The motor bearing device of claim 1 wherein said adhesive is an ultraviolet cure type adhesive curable by the application of an outside light.

5. A motor bearing device, comprising:
   a rotary shaft;
   a bearing housing having a hole therein, said hole being defined by an inner surface of said bearing housing, and said bearing housing further having a bearing insertion side.;
   a ball bearing arranged in said hole of said bearing housing, and said ball bearing including an outer ring having an outer surface fixed in said hole of said bearing housing with an adhesive; and
   an adhesive puddle formed at said outer surface of said outer ring of said ball bearing and located toward said bearing insertion side of said bearing housing, a part of said adhesive being trapped in said adhesive puddle.

6. The motor bearing device of claim 5, wherein said adhesive puddle is an annular recess formed on said outer surface of said outer ring of said ball bearing and located toward said bearing insertion side of said bearing housing.

7. The motor bearing device of claim 6, wherein said adhesive is an ultraviolet cure type adhesive curable by the application of an outside light.

8. The motor bearing device of claim 5, wherein said adhesive is an ultraviolet cure type adhesive curable by the application of an outside light.

* * * * *